3,395,038
MULTILAYER FILM COMPRISING POLYPROPYL-
ENE CONSISTING ESSENTIALLY OF STEREO-
BLOCK MACROMOLECULES HAVING ISOTAC-
TIC CHAIN SECTIONS
Luciano Lucchetti, Milan, Italy, assignor to Montecatini
Edison S.p.A., Milan, Italy
Continuation-in-part of application Ser. No. 805,492,
Apr. 10, 1959. This application Apr. 24, 1964, Ser.
No. 363,069
Claims priority, application Italy, Apr. 15, 1958,
588,200/58
4 Claims. (Cl. 117—122)

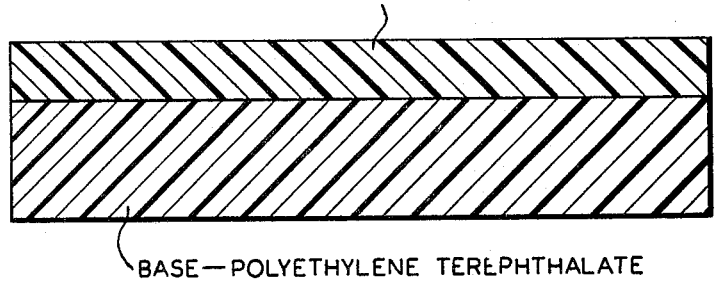

ABSTRACT OF THE DISCLOSURE

Multilayered film, resistant to permeation by water vapor, comprising (1) a base film at least one surface of which has bonded directly thereto (2) an elastic, readily heat-sealable layer of (A) polypropylene having a low molecular weight corresponding to an intrinsic viscosity not greater than 1.0 as determined in Tetralin at 135° C. and made up essentially of stereoblock macromolecules, the main chains of which show isotactic sections and amorphous atactic sections, these macromolecules being non-extractable with boiling ether but extractable with boiling n-heptane and exhibiting from 1% to 50% crystallinity when examined under X-rays at room temperature or (B) chlorination products of said polypropylene containing from 10% to 50% by weight of combined chlorine.

---

This application is a continuation-in-part of my application Ser. No. 805,492, filed Apr. 10, 1959, now abandoned.

This invention relates to new multilayer films which are readily heat-sealable and resistant to permeation by water vapor, and which are particularly suitable for packaging purposes.

One disadvantage of the known packaging films involves the difficulty encountered in heat-sealing or heat-welding the film together. Another disadvantage is that various of the films available for packaging purposes are permeable to water vapor and are therefore unsuitable for packagnig materials comprising aqueous media, or for packaging materials which must be maintained in essentially dry condition and where the package will be exposed to relatively high humidities.

The primary object of this invention is to provide a film which is readily heat-sealable to itself and which exhibits outstanding resistance to permeation by water vapor.

This and other objects which will be apparent hereinafter are accomplished by the present invention in accordance with which at least one surface of a supporting or base film has bonded directly thereto an elastic, readily heat-sealable layer of polypropylene consisting essentially of stereo-block macromolecules, or of a chlorination product of such a polypropylene.

In their pending application Ser. No. 550,164, filed Nov. 30, 1955, Natta et al. disclosed a process for polymerizing propylene, in contact with stereospecific catalysts prepared by mixing a violet crystalline material comprising violet $TiCl_3$ with trialkyl Al or dialkyl Al monohalide, to a crude polypropylene comprising a mixture of oily polymers, amorphous (atactic) macromolecules soluble in boiling ether, partially crystalline (stereoblock) macromolecules soluble in boiling n-heptane, and highly crystalline (isotactic) macromolecules insoluble in boiling acetone, ether and n-heptane. The partially crystalline macromolecules insoluble in boiling ether but soluble in boiling n-heptane, and the highly crystalline macromolecules insoluble in both boiling ether and boiling n-heptane exhibit the crystallinity due to the presence therein of isotactic type stereoregularity as is shown, also, in the paper by Natta et al., "The Crystalline Structure of a New Type of Polypropylene," published Jan. 29, 1955, in the Proceedings of the Accademie Nazionale Dei Lincei.

The polypropylene bonded directly to at least one surface of the base film in accordance with this invention is polypropylene consisting essentially of isotactic stereoblock macromolecules and characterized by exhibiting 1% to 50% of isotactic crystallinity, having an intrinsic viscosity below 1.0, specifically an intrinsic viscosity of 0.98 to 0.35 as determined in tetralin at 135° C., and by being insoluble in boiling acetone and boiling ether, but soluble in boiling n-heptane; and chlorination products of said polypropylene containing 10% to 50% by weight of combined chlorine.

As disclosed by Natta et al., the isotactic stereoblock polypropylene can be obtained by extracting crude polypropylene comprising the mixture of sterically differentiated macromolecules (atactic, stereoblock and isotactic) with boiling acetone to remove oily polymers; then with boiling ether to remove atactic macromolecules; and finally with boiling n-heptane to remove the isotactic stereoblock macromolecules. When the crude (or total) polypropylene is produced by polymerizing propylene in contact with a stereospecific catalyst, and is free of oily polymers and has a very low content of atactic macromolecules, the isotactic stereoblock polypropylene used in practicing this invention can be obtained by extracting the crude polypropylene directly with a solvent for the stereoblock macromolecules.

This invention is not dependent on the manner in which the polypropylene consisting essentially of the stereoblock macromolecules is obtained.

We found that the specific relatively low molecular weight polypropylenes consisting essentially of stereoblock macromolecules the main chains of which are made up of atactic amorophous sections, which are non-crystallizable under any conditions, and of sections having isotactic stereoregularity by virtue of which the polypropylene exhibits 1% to 50% of isotactic type crystallinity, and the chlorination products thereof containing 10% to 50% combined chlorine, have a balanced combination of adhesive and elastic properties which make them peculiarly suitable for use in making multilayer packaging films. Said polypropylenes and the chlorination products are sufficiently adhesive to bond directly to the surface of films made from various materials which form self-supporting films without requirig an intermediate extraneous adhesive or bonding agent but insufficiently adhesive to make the multi-layer film sticky to the touch or subject to "blocking," and at the same time have sufficient elasticity to result in a mulitlayer film which is flexible and not prone to rupture on repeated flexing.

The relaitvely low molecular weight polypropylene consisting essentially of the stereoblock macromolecules exhibiting 1 to 50% isotactic crystallinity can be chlorinated by treating the polypropylene with chlorine in a solvent such as carbon tetrachloride. The resulting solution of the chlorinated polypropylene can be applied directly to the base film after excessive chlorine has been eliminated and the solution has been filtered. It may be preferred to use other solvents for the chlorinated polypropylene, in applying the latter to the base film. In that case, the chlorinated polypropylene is precipitated from the $CCl_4$ or the like with methanol, filtered, dried, and then dissolved in the desired solvent which may be, for example, chloroform, trichloroethylene, perchloroethylene, toluol, or the like.

The polypropylenes consisting essentially of the stereoblock macromolecules and containing from 10% to 50% of combined chlorine provide transparent coatings or linings which exhibit good adhesion to the various base films, and in particular to base films made from or comprising regenerated cellulose and cellulose derivatives, vinyl homopolymers and copolymers, polypropylene consisting essentially of isotactic polypropylene made up of macromolecules having substantially isotactic structure, polyethylene terephthalate, and so on.

The polypropylene consisting essentially of the stereoblock macromolecules and the chlorination products can be applied to the base film in solution in any convenient way. In a preferred embodiment, the base film is immersed in a solution of the polypropylene or chlorinated polypropylene.

The vehicle for the polypropylene or chlorinated polypropylene may be any liquid in which the polypropylene or chlorinated polypropylene is soluble and which is not a solvent or strong swelling agent for the base film.

When the base film comprises polyethylene terephthalate, the polypropylene or chlorination product thereof may be applied in aqueous dispersion. For instance, the polypropylene can be chlorinated in a carbon tetrachloride solution, and the mixture can be emulsified with water by conventional methods to obtain the dispersion which can then be applied to the polyethylene terephthalate base film by immersing the latter in a bath of the dispersion at a temperature between 90° C. and 100° C.

A self-explanatory drawing of this specific product is attached hereto.

The test used conventionally for measuring the permeability of films to water vapor is as follows:

The film is placed upon an aluminum vessel containing a given quantity of water. The system is then weighed accurately and placed in an oven with forced draft circulation, regulated at 40° C., and the weight loss is determined every hour until the weight appears to have become constant. The loss of weight is then converted into grams of water lost per millimeter of thickness per 100 square millimeters of the surface under a difference in pressure of 1.0 cm. of Hg.

Heat-weldability is evaluated by sealing together two ends of lined (coated) film strips 8 cm. long and 2 cm. wide, using an electric impulse welding machine. The efficiency of the weld or seal is measured by fixing the two free ends of the film strips to the clamps of a dynamometer which are moving in opposite directions at a standard speed.

This test obviously also represents a measure of adhesion of the lining to the supporting film.

The load required to separate two strips the ends of which are coated (or lined) in accordance with the present invention and then heat-sealed are expressed in kg./cm. and in gm./in. in the tables given in the following examples. Said examples, in which the permeability and the strength of the heat seal or weld of films according to this invention are compared with those of untreated base films, are given to illustrate the invention. The parts given in the example are by weight unless otherwise indicated.

EXAMPLE I

A propylene polymer obtained by polymerizing propylene in contact with a stereospecific catalyst (prepared from e.g., $TiCl_3$ and diethyl Al chloride) was subjected to extraction with n-heptane to obtain polypropylene consisting essentially of the stereoblock macromolecules having isotactic chain sections showing 40% crystallinity by X-ray examination at room temperature, and characterized by being insoluble in boiling n-heptane. The stereoblock polypropylene is dissolved at 70° C. in carbon tetrachloride and treated with chlorine gas for four hours. The solution is then precipitated with methanol and the polypropylene consisting essentially of stereoblock macromolecules and having an intrinsic viscosity of 0.71, determined in tetralin at 135° C., is found to contain, after drying, 33.6% of chlorine by weight. Twenty parts of said polypropylene is dissolved in 100 parts of a mixture consisting of 70 parts of chloroform and 30 parts of toluol. A film of polyethylene terephthalate having a thickness of 50 microns is passed through a bath consisting of the solution at room temperature and thereafter dried in an air current at 60° C.

A transparent layer or lining of the polypropylene having a thickness of 5 microns is firmly adhered directly to the polyethylene terephthalate film to provide a multilayer film which is resistant to permeation by water vapor and heat-weldable. The characteristics of the multilayer film are shown in Table I.

TABLE I

| Film | Water Vapor Permeability, gm./100 sq. m./hr. at 40° C. | Load Required to Separate Weld | |
|---|---|---|---|
| | | (kg./cm.) | (gm./in.) |
| Unlined | 144 | 0 | 0 |
| Lined with stereoblock polypropylene 33.6% Cl. | 25 | 0.210 | 533 |

EXAMPLE II

The stereoblock polypropylene mentioned in the previous example is chlorinated for six hours. It is found to have an intrinsic viscosity of 0.68, determined in tetralin at 135° C., and to contain 45.6% by weight of chlorine. The characteristics of the polyethylene terephthalate film lined or coated with this chlorinated polypropylene are given in Table II.

TABLE II

| Film | Water Vapor Permeability, gm./100 sq. m./hr. at 40° C. | Load Required to Separate Weld | |
|---|---|---|---|
| | | (kg./cm.) | (gm./in.) |
| Unlined | 144 | 0 | 0 |
| Lined with stereoblock polypropylene 45.06% Cl. | 31 | 0.25 | 635 |

EXAMPLE III

The process described in the preceding examples was applied to films made from copolymers of 90 parts vinyl chloride and 10 parts vinyl acetate. The films had a thickness of 50 microns. The n-heptane extract was further extracted with acetone before it was used (intrinsic viscosity 0.8 determined in Tetralin at 135° C.), and chlorinated as in Example I to a combined chlorine content of 26.78% by weight. The following table shows the permeability values for the unlined copolymer base film and for such film after coating (or lining) with the chlorinated polypropylene consisting essentially of isotactic stereoblock macromolecules.

TABLE III

Film:                     Water vapor permeability, gm./100 sq. m./hr. at 30° C.
  Unlined film from a copolymer of vinyl chloride 90 and vinyl acetate 10 parts _____ 210
  Lined film _____ 37

Example IV

A crude polypropylene obtained by means of stereospecific catalysts as disclosed herein was extracted with diethyl ether to remove amorphous, atactic macromolecules, and the residue of such extraction was then extracted with n-heptane, thereby recovering a fraction consisting of anisotactic stereoblock polypropylene showing 40% crystallinity at the X-rays at room temperature. This fraction was processed as in Example I, thereby obtaining a satisfactory heat-sealable, water vapor resistant polyethylene terphthalate film.

EXAMPLE V

The process of Example I was duplicated, but without any chlorination of the stereoblock polypropylene. A satisfactory heat-sealable, water vapor resistant multilayer film was obtained.

EXAMPLE VI

The process of Example IV was duplicated, but without chlorination of the stereoblock polypropylene. A satisfactory heat-sealable, water vapor resistant multilayer film obtained.

EXAMPLE VII

The base film is a biaxially stretched polypropylene film having a thickness of 25 microns and obtained by extruding polypropylene consisting essentially of isotactic polypropylene made up of isotactic macromolecules (i.e. macromolecules having substantially isotactic stereoregular structure) and having the following characteristics: $[\eta]=2.1$ (measured in tetrahydronaphthalene at 135° C.); ash residue=0.017%; residue after extraction with boiling n-heptane=96%.

One surface of said base film is coated, by means of a conventional spreading and coupling machine for thin films, with a 10% solution, in a mixture of 70 parts heptane and 30 parts toluene, of polypropylene consisting essentially of isotactic stereoblock macromolecules insoluble in boiling ether but soluble in boiling n-heptane, and having an intrinsic viscosity of 0.78 measured in tetrahydronaphthalene at 135° C., the solution being prepared at room temperature. After spreading of the solution on the surface of the base film, the coating is dried at 95° C.

The multilayer film has the following characteristics:

Thickness of the coating _____ 2 microns.
Blocking at 43° C. (ASTM D1146–53)___ Absent.
Slip (coefficient of static friction measured
 with a T.M.I. slip tester) _____ 0.5–0.55.
Sealing strength (peeling test), coated/coated, sealing temperature 135° C._____ 125 gm./cm.

EXAMPLE VIII

A base film as in Example VII is coated with a 10% solution of polypropylene consisting essentially of the boiling ether-nonextractable, boiling heptane-extractable stereoblock macromolecules and chlorinated to a combined chlorine content of 36.9%, in a solvent is described in Example VII, the solution being prepared at room temperature. The coated film is dried at 95° C., and after drying has the following characteristics:

Thickness of the coating _____ 2 microns.
Blocking at 43° C. (ASTM D1146–53)___ Absent.
Slip (coefficient of static friction measured
 with a T.M.I. slip tester) _____ 0.35–0.37.
Sealing strength (peeling test), coated/coated, sealing temperature 135° C._____ 125 gm./cm.

EXAMPLE IX

A propylene polymer consisting essentially of isotactic stereoblock polypropylene and showing 35% crystallinity on X-ray examination at room temperature is obtained by extracting polypropylene produced by polymerizing propylene, in contact with a stereospecific catalyst (as disclosed by Natta et al.), with trichloroethylene and is then subjected to acetone extraction to remove oily polymers, after which it is chlorinated for five hours at 70° C. as in Example I. After precipitation and drying, the chlorinated polypropylene (0.5 intrinsic viscosity, determined in tetralin at 135° C.) is found to contain 40.17% by weight of combined chlorine.

The chlorinated polypropylene is dissolved in a mixture of 80 parts chloroform and 20 parts toluol, a 20% solution of the chlorinated polymer being obtained. This solution is used as in Example I. The lined or coated polyethylene terephthalate film has characteristics as given in Table IX.

TABLE IX

| Film | Water Vapor Permeability, gm./100 sq. m./hr. at 40° C. | Load Required to Separate Weld | |
|---|---|---|---|
| | | (kg./cm.) | (gm./in.) |
| Unlined | 144 | 0 | 0 |
| Lined | 64 | 0.310 | 787 |

EXAMPLE X

The process described in Example IX is repeated twice, the base film being, in each run, a film of cellophane (regenerated cellulose) having a thickness of 35 microns, and using, as the lining or coating for the base films, trichloroethylene extracts of the crude (total) polypropylene further modified by extraction with acetone to remove oily polymers and then chlorinated as in Example I to obtain chlorinated polypropylenes consisting essentially of stereoblock macromolecules and containing, respectively, 29.12% (intrinsic viscosity 0.41) and 40% (intrinsic viscosity 0.49) of combined chlorine by weight. The thickness of the polypropylene coating or lining on the cellophane base films was 2–3 microns. The characteristics of the unlined and lined cellophane films are shown in Table X.

TABLE X

| Film | Water Vapor Permeability, gm./100 sq. m./hr. at 40° C. | Load Required to Separate Weld | |
|---|---|---|---|
| | | (kg./cm.) | (gm./in.) |
| Unlined cellophane | 2.152 | (¹) | 0 |
| Cellophane lined with chlorinated polypropylene: | | | |
| 29.12% Cl | 137 | 0.190 | 482 |
| 40.0% Cl | 93 | 0.145 | 368 |

¹ Unweldable.

EXAMPLE XI

The process of Example X was duplicated, but without chlorination of the polypropylene. A satisfactory heat-sealable, water vapor resistant film was obtained.

It is understood that the inventor intends to claim, as a part of his invention, any variation, substitution and changes that lie within the scope of the invention and the hereinafter appended claims and intends to include within the scope of said claims such changes as may be apparent to those skilled in the art in the practice of the principles of this invention and within the scope as set forth in the hereinbelow-state application.

It will be understood that this invention is susceptible to modification in order to adapt it to different usages and conditions, and, accordingly, it is desired to comprehend such modifications within the invention as may fall within the scope of the appended claims.

What is claimed is:

1. A multilayered film which is resistant to permeation by water vapor comprising a basic film selected from the group consisting of a film of polyethylene terephthalate, a film of regenerated cellulose, a film of a copolymer of vinyl chloride and vinyl acetate and a film of polypropylene consisting essentially of isotatic polypropylene made up of isotactic macromolecules non-extractable with boiling n-heptane, at least one surface of which base film has bonded directly thereto an elastic, readily heat-sealable layer of a material selected from the group consisting of (A) polypropylene having a low molecular weight corresponding to an intrinsic viscosity not above 1.0 as determined in tetralin at 135° C. and made up essentially of stereoblock macromolecules the main chains of which are made up of isotactic sections and amorphous atactic sections, with macromolecules are characterized by being non-extractable with boiling ether but extractable with boiling n-heptane and in exhibiting from 1% to 50% crystallinity when examined under the X-rays at room temperature; and (B) chlorination products of said polypropylene in which the amount of combined chlorine is from 10% to 50% by weight.

2. The multilayered film of claim 1 wherein the heat-sealable layer consists essentially of the polypropylene made up essentially of the stereoblock macromolecules.

3. The multilayered film of claim 1 wherein the heat-sealable layer consists essentially of a chlorination product of the polypropylene made up essentially of the stereoblock macromolecules.

4. The multilayer film of claim 3 wherein the polypropylene is made up essentially of stereoblock macromolecules whcih exhibit from 30% to 40% of isotactic crystallinity when examined under the X-rays at room temperature.

References Cited

UNITED STATES PATENTS

| | | | |
|---|---|---|---|
| 3,112,211 | 11/1963 | Ward | 117—21 |
| 2,849,431 | 8/1958 | Baxter | 260—93.7 |
| 2,910,385 | 10/1959 | Berry et al. | 117—138.8 |
| 2,931,740 | 5/1960 | Riboni | 117—138.8 |
| 2,971,858 | 2/1961 | di Giulio | 117—12 |
| 2,979,410 | 4/1961 | Parlour | 99—171 |
| 3,013,003 | 12/1961 | Maragliano et al. | 260—93.7 |
| 3,014,016 | 12/1961 | Natta et al. | 260—93.5 |
| 3,027,343 | 3/1962 | Kane | 260—33.6 |
| 3,036,930 | 5/1962 | Grimminger et al. | 117—93 |
| 3,050,503 | 8/1962 | Natta et al. | 260—79.3 |
| 3,073,790 | 1/1963 | Bosoni | 260—29.6 |
| 3,075,857 | 1/1963 | Fior et al. | 117—76 |
| 3,091,536 | 5/1963 | Rusignuolo et al. | 96—87 |
| 3,141,872 | 7/1964 | Natta et al. | 260—93.7 |
| 3,192,188 | 6/1965 | Orthner et al. | 260—88.2 |
| 3,236,675 | 2/1966 | Hermitte et al. | 117—47 |
| 3,258,340 | 6/1966 | Riboni | 96—87 |
| 3,262,808 | 7/1966 | Crooks et al. | 117—47 |

FOREIGN PATENTS

| | | |
|---|---|---|
| 538,782 | 12/1955 | Belgium. |
| 797,571 | 7/1958 | Britain. |

OTHER REFERENCES

Natta, "How Giant Molecules Are Made," Scientific American, vol. 197, No. 3, pp. 98 to 104, September 1957.

"Moplen," Technical Information, December 1957, pp. 3 to 7, Chemore Corp, New York.

WILLIAM D. MARTIN, *Primary Examiner.*

W. D. HERRICK, *Assistant Examiner.*

UNITED STATES PATENT OFFICE
CERTIFICATE OF CORRECTION

Patent No. 3,395,038                                                          July 30, 1968

Luciano Lucchetti

It is certified that error appears in the above identified patent and that said Letters Patent are hereby corrected as shown below:

Column 4, TABLE III, line 2, "30° C." should read -- 40° C. --. Column 6, line 55, "basic" should read -- base --.

Signed and sealed this 20th day of January 1970.

(SEAL)
Attest:

Edward M. Fletcher, Jr.                                 WILLIAM E. SCHUYLER, JR.
Attesting Officer                                                Commissioner of Patents